US008385363B2

(12) United States Patent
Ray et al.

(10) Patent No.: US 8,385,363 B2
(45) Date of Patent: Feb. 26, 2013

(54) SYSTEM AND METHOD FOR ADAPTING ANALOG SYSTEMS TO COMMUNICATE WITH PACKET NETWORKS

(75) Inventors: Amar N. Ray, Shawnee, KS (US); John M. Heinz, Olathe, KS (US); Warren K. Okeson, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1132 days.

(21) Appl. No.: 11/803,880

(22) Filed: May 15, 2007

(65) Prior Publication Data

US 2008/0285594 A1     Nov. 20, 2008

(51) Int. Cl.
    *H04J 3/12*      (2006.01)
(52) U.S. Cl. ......... 370/466; 370/525; 370/526; 379/339
(58) Field of Classification Search .................. None
See application file for complete search history.

(56) References Cited

U.S. PATENT DOCUMENTS

| | | | | |
|---|---|---|---|---|
| 5,119,322 A | * | 6/1992 | Stroobach | 708/312 |
| 5,481,589 A | * | 1/1996 | Morduch | 379/52 |
| 5,495,522 A | * | 2/1996 | Allen et al. | 379/202.01 |
| 5,619,564 A | * | 4/1997 | Canniff et al. | 379/386 |
| 6,014,441 A | * | 1/2000 | Mark | 379/361 |
| 6,370,244 B1 | * | 4/2002 | Felder et al. | 379/386 |
| 6,370,555 B1 | * | 4/2002 | Bartkowiak | 708/311 |
| 7,106,843 B1 | * | 9/2006 | Gainsboro et al. | 379/191 |
| 7,180,892 B1 | * | 2/2007 | Tackin | 370/389 |
| 7,313,150 B2 | * | 12/2007 | Naudot et al. | 370/433 |
| 7,508,816 B1 | * | 3/2009 | Everson et al. | 370/352 |
| 2002/0101854 A1 | * | 8/2002 | Siegrist et al. | 370/352 |
| 2004/0176056 A1 | * | 9/2004 | Feng | 455/130 |

OTHER PUBLICATIONS

"Alarm-to-VoIP Connection: It's Possible, but not Recommended", Posted: Mar. 1, 2005, 3 pages.

* cited by examiner

*Primary Examiner* — Kevin C Harper
*Assistant Examiner* — Rhonda Murphy
(74) *Attorney, Agent, or Firm* — Patton Boggs, LLP

(57) ABSTRACT

A system for adapting an analog system to a packet network may include an electronic signal adapter in communication with the analog system and packet network. The electronic signal adapter may be configured to convert information received in data packets from the packet network into dual-tone multiple frequency (DTMF) signals and single tone analog signals and to communicate the DTMF and single tone analog signals to the analog system. The single tones may have a signal strength below approximately −25 dBm. The electronic signal adapter may further be configured to receive and convert analog signals into digital data for communication in data packets over a packet network.

9 Claims, 5 Drawing Sheets

SYSTEM AND METHOD FOR ADAPTING ANALOG SYSTEMS TO COMMUNICATE WITH PACKET NETWORKS

BACKGROUND OF THE INVENTION

Legacy analog systems that have traditionally communicated over public switched telephone networks to communicate with service providers have become antiquated due to improvement to telecommunications networks. For example, packet networks that were developed for Internet communications have evolved to enable voice over Internet Protocol (VoIP) telephone communications using data packets to communicate speech. Having the ability to use packet networks to communicate both voice and data, consumers have begun canceling conventional public-switched telephone network telephone services to exclusively use packet network communications services via a digital subscriber line (DSL) or cable network services for Internet and telecommunications services.

One problem that exists for consumers who have legacy analog security systems or other analog self-interacting systems is that these analog systems require analog loop access network infrastructure. Because of the migration of the telecommunications networks from PSTN to packet based networks, digital systems that are compatible with packet based networks are replacing the legacy analog systems. However, replacement of the legacy analog systems with digital systems is expensive for consumers and security service providers.

FIG. 1 is an illustration of an exemplary configuration of a residential network 100 that includes telecommunications devices 102, Internet access devices 104, and analog home security system 106. More specifically, the telecommunications services may include one or more telephones 108a-108b and fax machine 110, for example. A docking station 113 may be utilized to provide wireless communications within the residential location. A computing device 112, such as a personal computer, and modem 114 may be used for Internet access. A telephone line distribution box 116 may be connected to the modem 114, docking station 113, telephone 108b, and fax machine 110. A security system 106 may include one or more sensors 118 that are disposed within the residential location for sensing intruders. A telephone line distribution box 120 or DMARK, as understood in the art, may be used for communicating with the security system 106 and for communicating communications, such as telecommunications and Internet access communications, from the residential location. As shown, the service provider telephone line distribution line 120 is connected to the PSTN 122 or other time division multiplexing (TDM) network. The communications shown are analog communications that use two wire lines for connecting the security system 106 and telephone line distribution box 116.

In operation, when not in a security condition, the analog security system 106 provides direct connection between the telephone line distribution box 116 and the service provider telephone line distribution box 120. During a security event, the security system 106 disconnects the house side through the operation of an internal relay switch (not shown). A security event, therefore, prevents use of the telephone 108b or computing device 112 that may be important to use during a security event to contact authorities in addition to the security service provider being contacted by the analog security system 106. The security event further prevents dial-up access services, such as pay-per-view cable boxes and satellite receivers. After being connected to the service provider telephone line distribution box 120, the security system 106 dials out to connect with a security monitoring facility 124. Upon connecting with the security monitoring facility 124, a handshaking procedure is performed for synchronization purposes and the security system 106 sends information, including the calling number and security cause of the event through dual-tone multiple frequency (DTMF) tones. Upon receiving a confirmation from a security monitoring facility 124, the security system 106 restores connection to the house, telephones and other devices via the relay switch.

FIG. 2A is a screen shot 200 of signaling collected by a signal analyzer 126 (FIG. 1) from the security system 106 communicating with the service provider telephone line distribution box 120. In one embodiment, the signal analyzer 126 may be a TSA-6000 model used for capturing analog signals communicated over a telephone line. A graph 202 shows a signal with a number of different events. The graph 202 includes alternating current (AC) coupled signaling of the security system. FIG. 2B shows a graph 202b of direct current (DC) coupled signaling of the security system 106. An alarm off-hook event 204 occurs and causes a DC voltage to drop from 50 volts to 0 volts. An alarm activated event 206 (FIG. 2A) occurs after the alarm off-hook event 204. In response to the alarm activated event 206, a dial tone 208 is provided to the security system 106 (FIG. 1). The security system 106, in receiving the dial tone 208, prevents the telephone monitoring distribution box 116 from receiving communications from the PSTN 122, thereby preventing telecommunications and Internet communication services. The dial tone 208 lasts for approximately 2 seconds, whereupon the security system 106 generates a DTMF signal 210 including data representative of a telephone number. The telephone number is used for calling the security monitoring facility 124 that manages and monitors the security system 106. As understood in the art, ringback signals 212a and 212b (collectively 212) are received by the security system 106. The ringback signals 212, as measured in this event, have a frequency at 440 Hz with signal strength of −32.8 dBm. As shown in FIG. 2B, the DC signal 214 is set at approximately 5 volts during operation of the security system 106.

When the security monitoring facility 124 picks up the call from the security system 106, an acknowledgement tone 216, which lasts for approximately one second and has the frequency of 1.4 KHz and an amplitude or signal strength of −29.4 dBm, is received by the security system 106. After the acknowledgment tone 216, two clear-to-send (CTS) tones 218a and 218b (collectively 218) are received by the security system 106 from the security monitoring facility 124. The CTS tones 218a and 218b, as measured in this event, have frequencies at 1.4 KHz and 2.3 KHz at amplitudes −29.4 dBm and −31.8 dBm, respectively. These CTS tones also have durations less than approximately 150 milliseconds (ms). In response to receiving the CTS tones 218 from the security monitoring facility 124, the security system 106 communicates a telephone number associated with the location of the security system 106 in the first ten digits of a DTMF signal to 220 and event description data in six digits following the ten digit telephone number in the DTMF signal 220. As shown, the telephone number is 403-918-1134 and the event description is 000015, which, in one embodiment, indicates that a front door has been opened. An acknowledgment signal 222, which may have the same parameters as the acknowledgement signal 216 is generated by the security monitoring facility 124 and received by the security system 106. In response to the security system 106 receiving the acknowledgement signal 222, the security system 106 goes back on hook at 224 (FIG. 2B) and telephone and Internet communications are restored to the household.

As shown in the graph 202a, there are several different types of signals that are communicated between the security system 106 and security monitoring facility 124. These signals include dial tone signals, ringback signals, single tone signals (e.g., CTS signals), and DTMF signals. Because some of the signals, such as ringback signals 212, acknowledgment signals 216 and 222, and CTS signals 218, have such low amplitudes (e.g. below −25 dBm), conventional analog to packet networks adapters are incapable of operating with analog security systems or other analog systems that have signal levels that are low or short (e.g. less than about 150 milliseconds). One reason why conventional adapters do not operate on signals below −25 dBm or on signals below 150 ms is that the ANSI/TIA-1063 standard for analog ports of packet-based user-premises terminal adapters specifies otherwise.

SUMMARY

To overcome the problem of having to replace legacy analog systems, such as analog security systems, the principles of the present invention provide for using an adapter that enables existing analog systems to communicate with packet networks. Because legacy analog systems often include the use of DTMF signals and other signaling, such as single tone signals and signals that have low amplitudes, the principles of the present invention provide for an adapter that supports DTMF signaling and other signaling, such as signal tone signaling. Additionally, the adapter may be configured to detect and generate short and low power signals that are used by legacy analog systems. For example, signals that are below −25 dBm and have a duration less than about 150 milliseconds may be detected, received, converted, and generated by the adapter.

A system for adapting an analog system to a packet network may include an electronic signal adapter in communication with the analog system and packet network. The electronic signal adapter may be configured to convert information received in data packets from the packet network into dual-tone multiple frequency (DTMF) signals and single tone analog signals and to communicate the DTMF and single tone analog signals to the analog system. The single tones may have a signal strength below approximately −25 dBm. The electronic signal adapter may further be configured to receive and convert analog signals into digital data for communication in data packets over a packet network.

A method for adapting an analog system to communicate over a packet network may include receiving data packets from a packet network. The data packets may include data representative of analog signals, where at least a portion of the analog signals have amplitudes below approximately −25 dBm. The data may be de-packetized from the data packets and converted into analog signals. The analog signals may be communicated to an analog system.

DETAILED DESCRIPTION OF THE DRAWINGS

Figure 3:
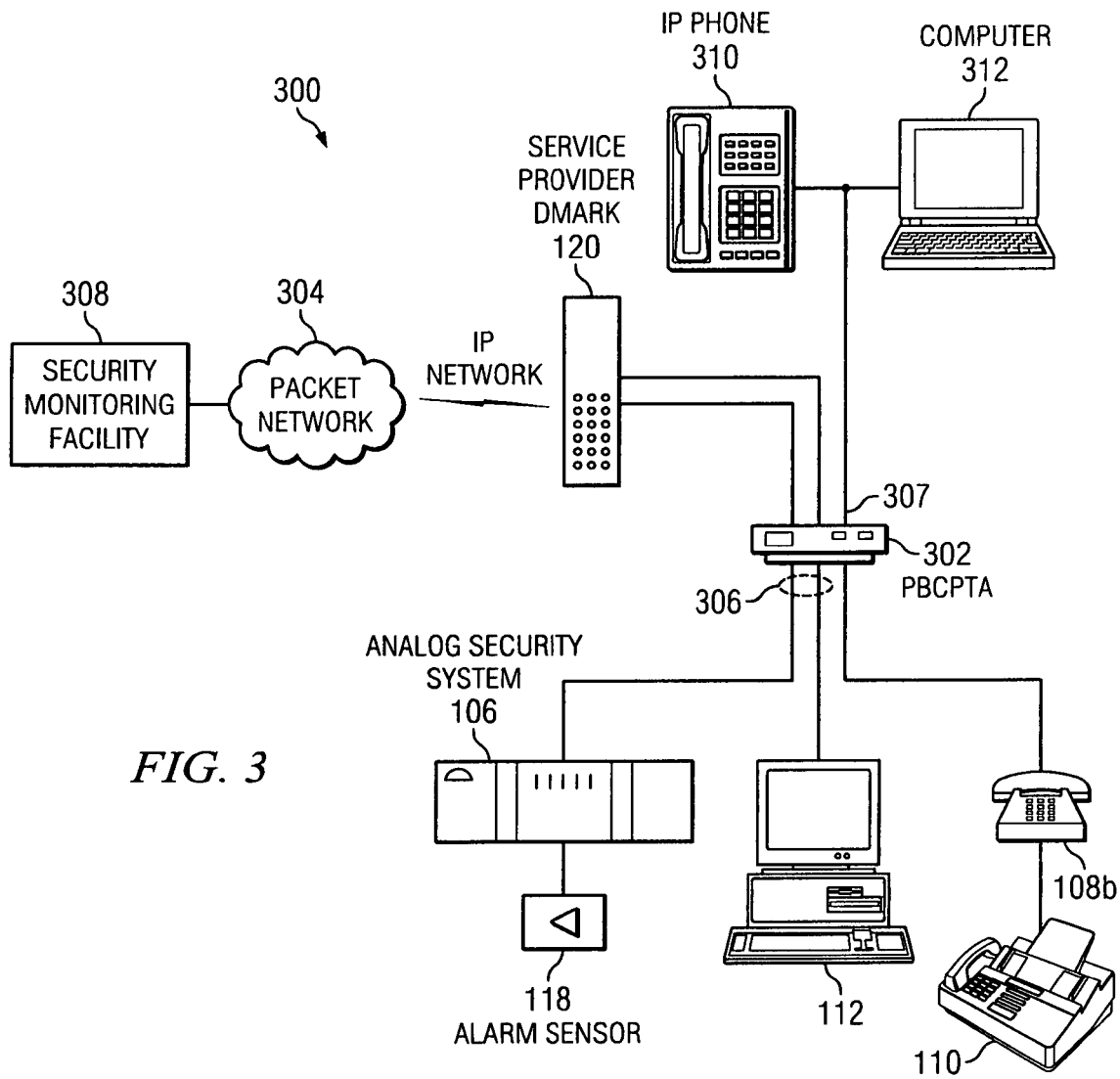
FIG. 3 is an illustration of an exemplary network that includes an analog security system and adapter configured to communicate with the analog security system and convert analog signals to packets for communication over a packet network.

FIG. 3 is an illustration of an exemplary network 300 that includes a legacy analog security system 106 and packet based customer premises terminal adapter (PBCPTA) or adapter 302 configured to communicate with the analog security system 106 and convert analog signals into data packets for communication over a packet network 304. The adapter 302 may be a packet based customer premises terminal adapter that is configured with analog ports 306 and IP ports 307. The analog ports 306 may be configured to communicate with the analog security system 106, computer 112, telephone 108b, and fax machine 110, for example. The IP ports 307 may be configured to communicate with an IP telephone 310 and computer 312, for example. There may be multiple analog and IP ports 306 and 307 to enable a user to connect multiple analog devices and IP devices to the adapter 302. It should be understood that these devices may communicate via the adapter 302 and operate in parallel.

The adapter 302 may operate to convert analog signals from the analog security system 106 and other analog devices into data packets for communication to the service provider telephone line distribution box 120 to a packet network 304 and security monitoring facility 308. In accordance with the principles of the present invention, the adapter 302 may be configured to detect analog signals that include DTMF signals and single tone signals that are short in duration (e.g., less than 150 milliseconds) and have low amplitudes (e.g., less than about −25 dBm). Other signals, such as dial tone, acknowledgement, and other signals may be processed by the adapter 302. By using the adapter 302, owners of legacy analog systems, such as the analog security system 106, may connect the adapter 302 to the legacy analog systems rather than replacing the legacy analog systems, thereby saving money for current owners of legacy analog systems. The adapter 302 may further provide higher levels in security and reliability due to using various protocols, as understood in the packet network art. Further, the adapter 302 may allow other communication devices (e.g., telephone 108b and computer 310) to be utilized during an alarm situation.

Figure 4:
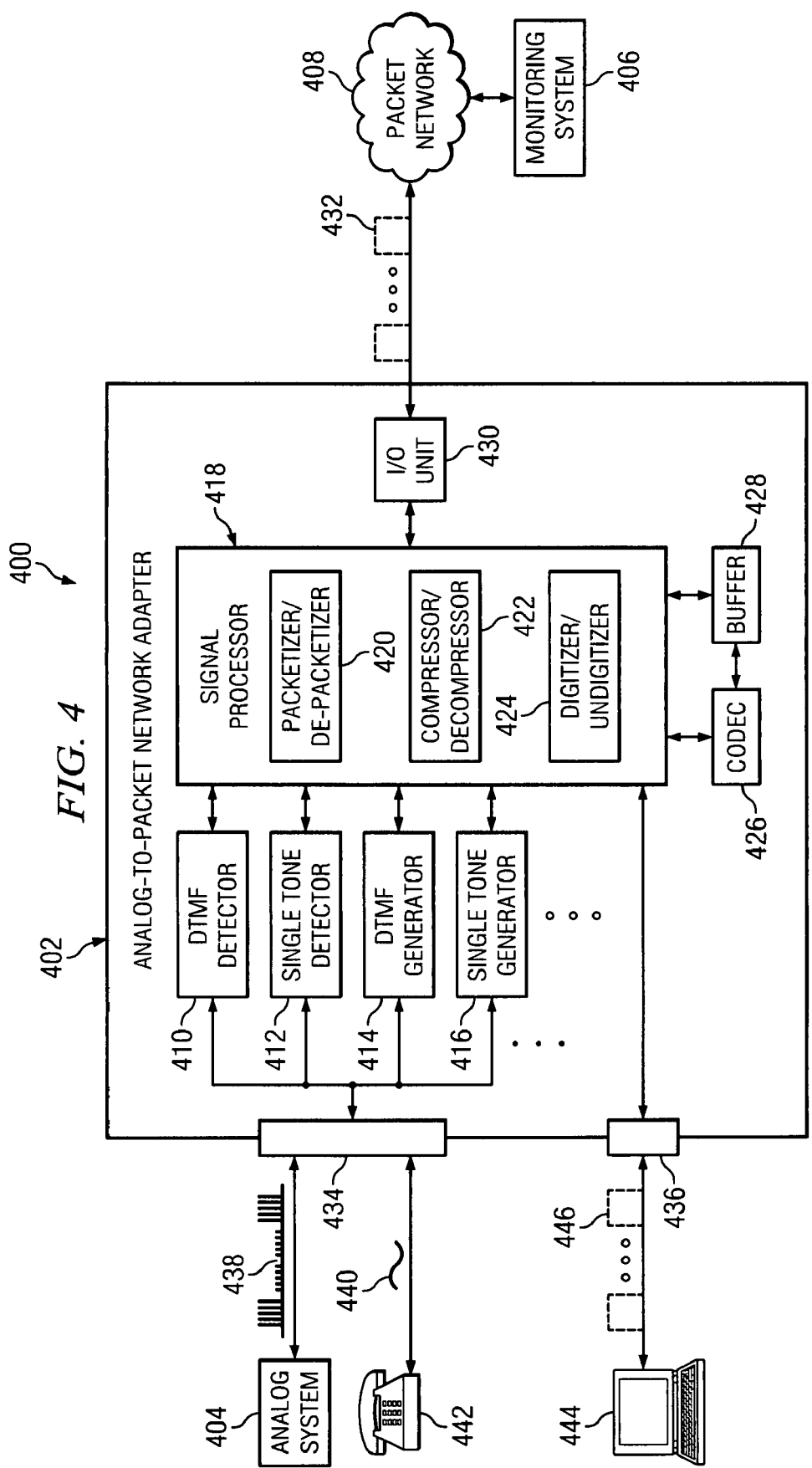
FIG. 4 is an illustration that includes details of exemplary internal components of an exemplary analog-to-packet network adapter.

FIG. 4 is an illustration of an exemplary network 400 that includes an analog-to-packet network adapter 402 and shows details of internal components of the adapter 402. An adapter 402 may be utilized to provide communications between analog system 404 and monitoring system 406 that resides on a packet network 408. The adapter 402 may include a number of detector and generator components including a DTMF detector 410, single tone detector 412, DTMF generator 414, and single tone generator 416. It should be understood that other tone detectors and tone generators may be included in the adapter 402. A signal processor 418 may be in communication with the detectors and generators and include a number of modules, including a packetizer/de-packetizer 420, compressor/decompressor 422, digitizer/undigitizer 424. These modules 420-424 may be configured in software, hardware, or firmware, as understood in the art. In one embodiment, the signal processor 418 is a 12-bit signal processor or any other n-bit processor that enables signals below −25 dBm and less than 150 ms to be detected and generated. One or more codec 426 may be in communication with the signal processor 418 and be utilized to perform coding and decoding operations as understood in the art. A buffer 428 may be memory that is utilized by modules 420-424 and codec 426 for storing information during processing of signals between the analog system 404 and monitoring system 406. The signal processor 418 may include one or more processors and include functionality of any of the detectors and generators, as well as the codec 426. In other words, the functionality for performing the principles of the present invention may be configured in a variety of different ways, including having each of the functions configured in a hardware module or software module, as understood in the art. An input/output (I/O) unit 430 may be in communication with the signal processor 418 and be utilized for communicating data packets 432 via the packet network 408. If the adapter 402 is receiving communications from the analog system 404, which may be a security system, the data packets 432 may be routed to the monitoring system 406. The adapter 402 may further include one or more analog ports 434 and IP ports 436. The analog ports 434 may be in communication with the analog system 404 that may communicate a number of different tones with the adapter 402, such as the tones described with respect to FIGS. 2A and 2B. The tones may be communicated from the analog system 404 to the adapter 402 via the analog ports 434. In addition, conventional telephone signals 440 may be communicated from a conventional analog telephone 442 via the analog ports 434 and converted by the adapter 402 into data packets 432. In addition, digital devices, such as a laptop computer 444, may communicate IP data packets 446 via the IP port 436. Other IP configured devices, such as a session initiated protocol (SIP) telephone, may also be connected to the IP port 436.

Figure 1:
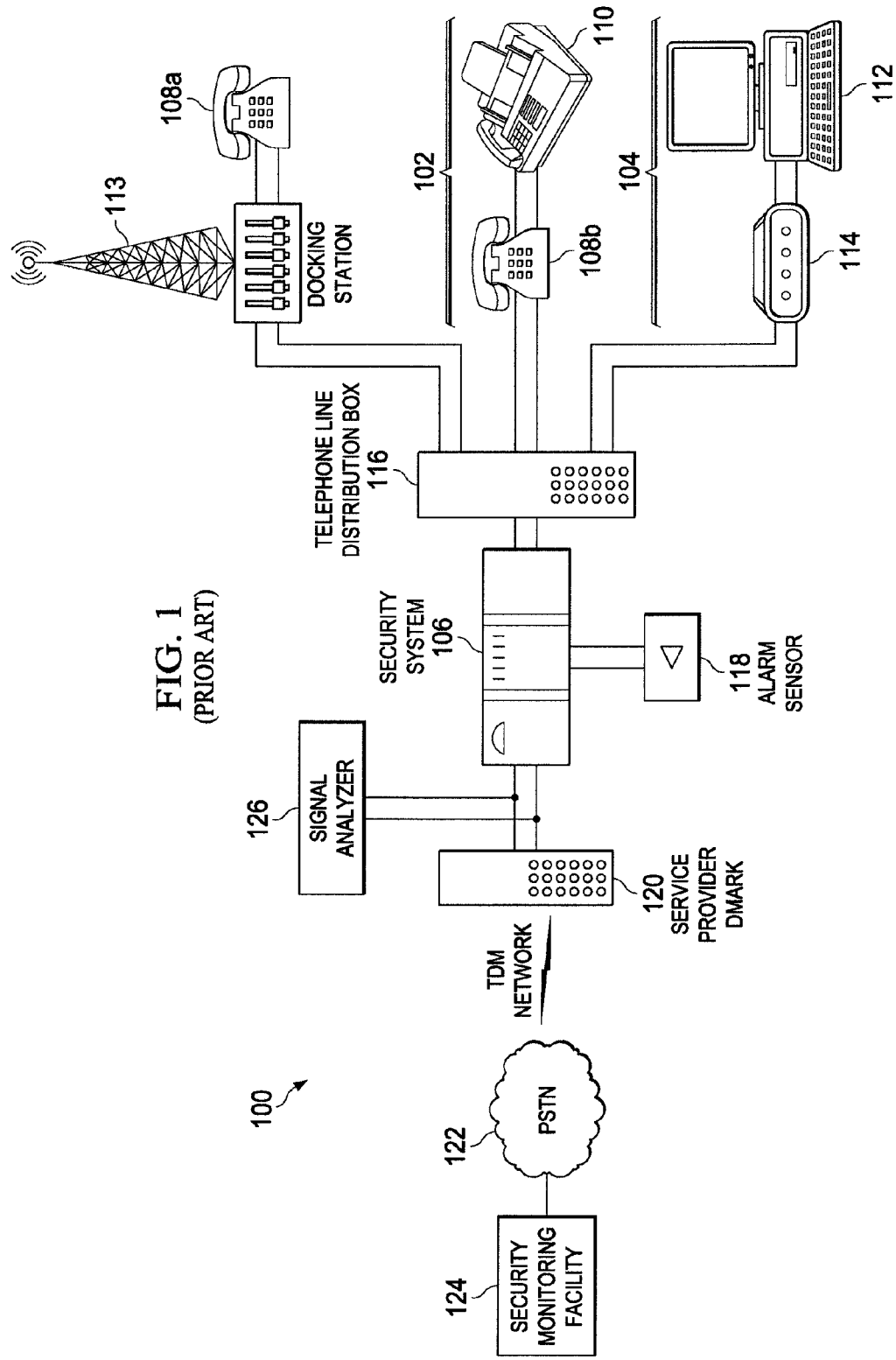
FIG. 1 is an illustration of an exemplary configuration of a residential network that includes telecommunications devices, Internet access devices, and analog home security system.
Figures 2A, 2B:
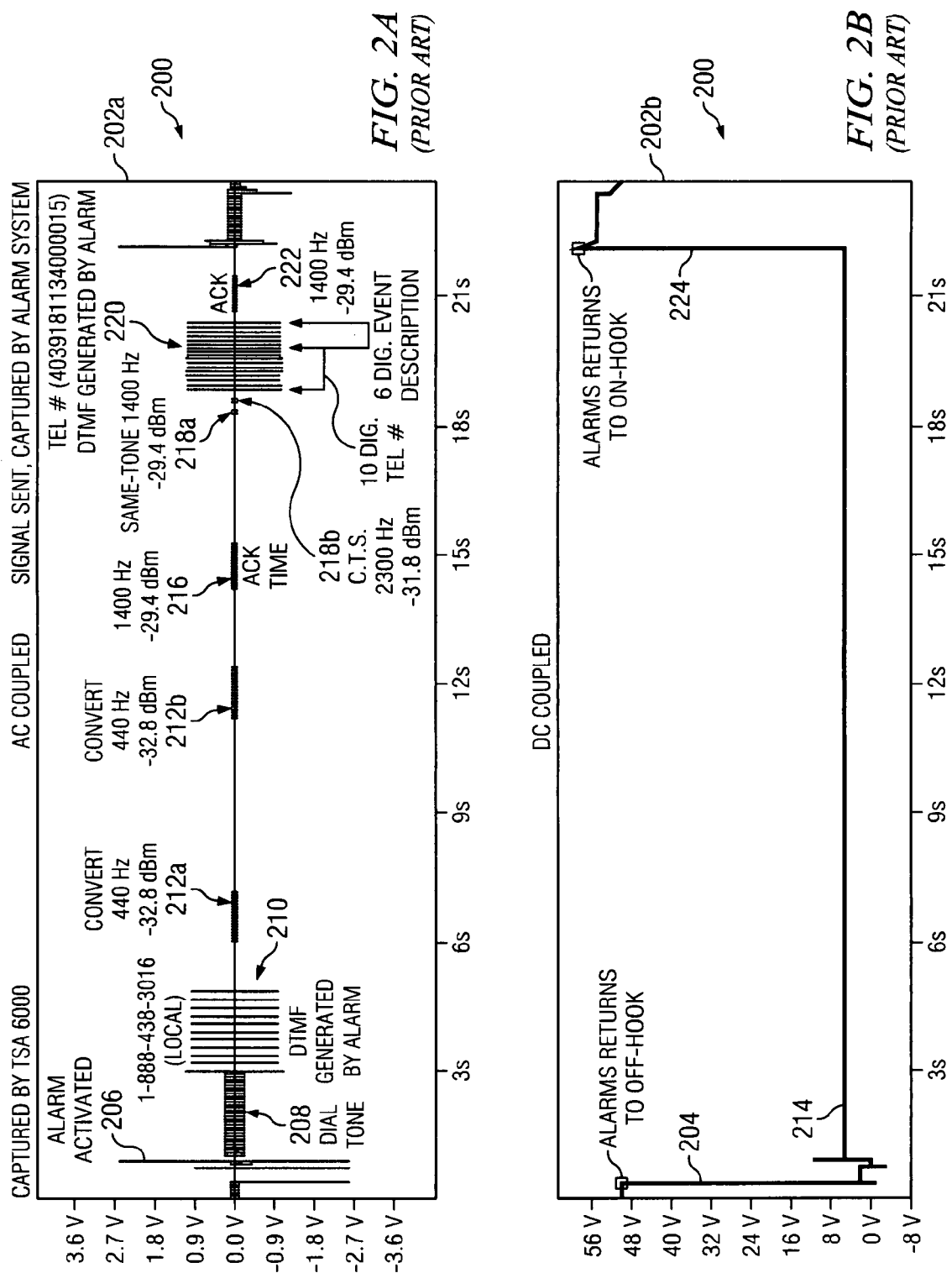
FIG. 2A is a screen shot of an exemplary signal collected by a signal analyzer of the security system communicating with the security provider telephone line distribution box.
FIG. 2B shows a graph of direct current (DC) coupled signaling of the alarm system.

The adapter 402 may operate to handle analog signals 438 that have short and low amplitude signals, such as those shown in FIG. 2A, by utilizing the signal processor 418 that is configured to provide high sensitivity to the analog signals being communicated to the analog system 404 or signals communicated from the monitoring system 406. The adapter 402 may include detectors, generators, and signal processor 418 configured for detecting and generating analog signals having short durations (e.g., less than about 150 milliseconds) and low amplitudes (e.g., below −25 dBm). Such sensitivity may be achieved by having the signal processor 418 operating with a fast processing speed and use enough bits to provide higher sensitivity for short signal duration and low amplitude, as understood in the art.

The analog signal 438 may include DTMF signals that are converted by the adapter 402 and transmitted through the packet network 408 using a voice transmission path. DTMF coded signals provide sixteen distinct digital signals for communicating DTMF signals in the voice transmission path. The signaling is based on simultaneous transmission of two frequencies, where each frequency belongs to a group of four frequencies. The signal frequencies are geometrically spaced and not harmonically related. The CCITT organization, which is now known as International Telecommunication Union (ITU), recommendation Q-23 defines the characteristics of the DTMF signaling in terms of frequency to generate a tone, as well as in terms of tolerance. The adapter 402 may be configured to accommodate the Q-23 recommendation. In addition, the adapter 402 may be configured to convert and transmit single tones in the data packets 432 using the voice transmission path by marking each frequency with a different header to identify a single tone. While voice is considered to be real-time traffic and no or minimal delay is permitted, single-tone communications may permit a certain amount of delay. However, the adapter 402 is configured to convert analog signals of single tones having short durations and low amplitudes with enough precision so that the analog system 404 and monitoring system 406 may properly communicate with one another, including hand shaking to enable proper functionality of the analog system 404. The precision may be maintained by using enough bits (e.g., 12 bits) and fast enough clock speeds (e.g., 2 MHz) so that the adapter does not attenuate or otherwise distort low amplitude signals communicated between the analog system 404 and monitoring system 406.

Figure 5:
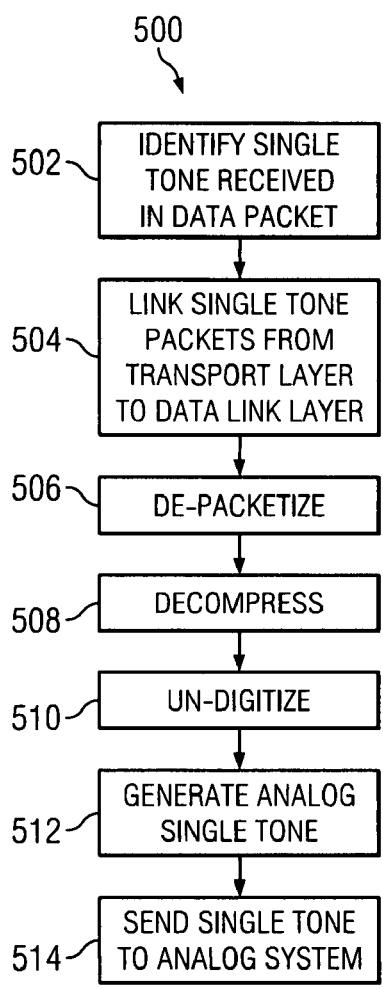
FIG. 5 is a flow diagram of an exemplary process for processing information representing a single tone communicated from a security monitoring facility in a data packet to include information of the single tone into an analog signal.

FIG. 5 is a flow diagram of an exemplary process for processing a single tone communicated from a security monitoring facility in a data packet into an analog signal. The process 500 starts at 502, where a single tone received in a data packet may be identified. At step 504, the single tone data packets may be linked from the transport layer (layer 4 of the OSI model) to data link layer (layer 2). At steps 506 and 508, the single tone data packets may be depacketized and decompressed, respectively. At step 510, the data representative of the single tone may be undigitized and analog single tone may be generated at step 512. At step 514, a single tone may be sent or communicated to the analog system. It should be understood that converting analog signals to digital packets may utilize in the reverse of the process of FIG. 5 for converting analog signals into data packets. It should be further understood that further processes for converting DTMF signals as understood in the art may be utilized in accordance with the principles of the present invention. Other signaling, such as dial tones, may also be converted utilizing conventional processes as understood in the art.

Figure 6:
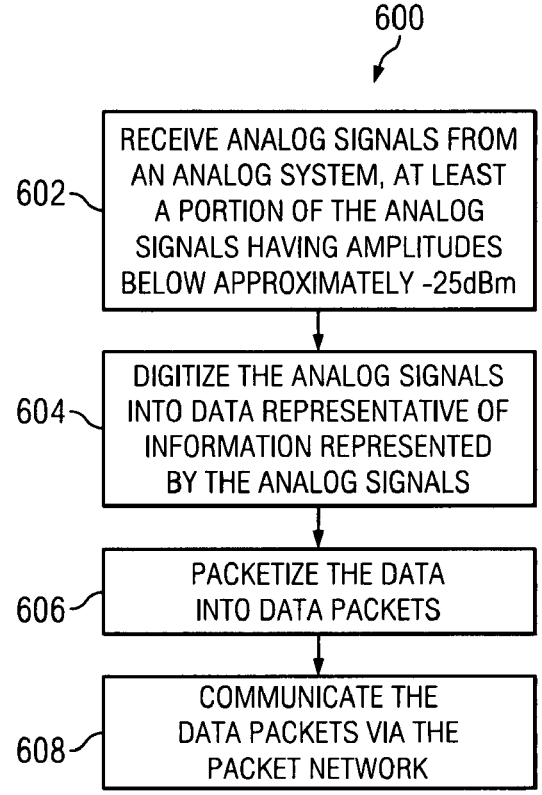
FIG. 6 is a flow diagram of an exemplary process for converting analog signals and communicating them over a packet network.

FIG. 6 is a flow diagram of an exemplary process 600 for converting analog signals and communicating them over a packet network. The process 600 starts at step 602, where analog signals are received from an analog system. At least a portion of the analog signals may have amplitudes below approximately −25 dBm. The analog signals may be digitized into data representative of information represented by the analog signals. The data may be packetized into data packets, as understood in the art. The data packets may be communicated via the packet network.

Figure 7:
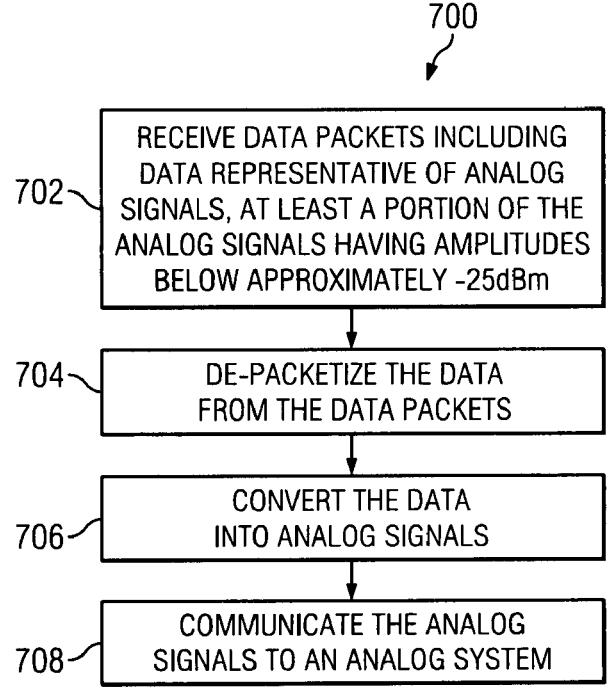
FIG. 7 is a flow diagram of an exemplary process for converting data packets including data representative of analog signals, converting the data into the analog signals, and communicating the analog signals to an analog system.

FIG. 7 is a flow diagram of an exemplary process 700 for converting data packets including data representative of analog signals, converting the data into the analog signals, and communicating the analog signals to an analog system. The conversion process 700 starts at step 702, where data packets including data representative of analog signals are received from a packet network. At least a portion of the analog signals have amplitudes below approximately −25 dBm as analog systems, such as analog security systems, may communicate with legacy systems over PSTN networks at signal levels below −25 dBm using single tones. At step 704, the data received in the data packets are de-packetized and converted into analog signals at step 706. At step 708, the analog signals are communicated to an analog system.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A system for adapting an analog system to communicate over a packet network, said system comprising:
   a security monitoring facility in communication with a packet network;
   an electronic signal adapter in communication with an analog security system and the packet network, said electronic signal adapter operable to convert information received in a first set of data packets from the security monitoring facility over the packet network into dual-tone multiple frequency (DTMF) signals and single tone analog signals having a signal strength below −25 dBm and durations of less than 150 ms, the electronic signal adapter configured to communicate the DTMF and single tone analog signals to the analog security system;
   wherein said electronic signal adapter is further configured to convert single tones having the signal strength below −25 dBm and durations of less than 150 ms received from the analog security system into a second set of data packets and transmit the second set of data packets over the packet network using a voice transmission path, and wherein the electronic signal adapter is further configured to mark each frequency in the second set of data packets with a different header to identify a single tone; and
   an IP telephone coupled to the electronic signal adapter, said IP telephone configured to be utilized by the security monitoring facility during an alarm situation to communicate with a user.

2. The system according to claim 1, wherein said electronic signal adapter includes:
   a DTMF detector configured to detect the DTMF signals received from the analog system;
   a single tone detector configured to detect single tone signals from the analog system; and
   a signal processor in communication with the DTMF detector and single tone detector and configured to:
   receive DTMF and single tone signals generated by the analog system;
   convert the information represented by the DTMF and single tone signals into data; and
   communicate the data over the packet network.

3. The system according to claim 1, wherein said electronic signal adapter uses at least a 12-bit processor.

4. The system according to claim 1, wherein the single tones have signal strength below −30 dBm.

5. The system according to claim 1, wherein said electronic signal adapter includes a de-packetizer, de-compressor, un-digitizer, and codec.

6. A method for adapting an analog system to communicate over a packet network, said method comprising:
   receiving data packets from a security monitoring facility over a packet network;
   de-packetizing the data from the data packets;
   converting, using a processor, the data into analog signals having amplitudes below −25 dBm;
   communicating the analog signals to an analog security system;
   receiving a second set of analog signals from the analog security system, at least a portion of the second set of analog signals having amplitudes below −25 dBm and wherein at least a portion of the second set of analog signals have durations of less than 150 ms;
   digitizing the second set of analog signals into data representative of information represented by the second set of analog signals, wherein digitizing the analog signals includes converting single tones into a second set of data packets and marking each frequency in the second set of data packets with a different header to identify a single tone; and
   communicating the second set of data packets over the packet network to the security monitoring facility using a voice transmission path.

7. The method according to claim 6, further comprising compressing the data in the second set of data packets prior to communicating the second set of data packets over the packet network.

8. The method according to claim 6, wherein communicating the data packets includes communicating the data packets on the transport layer of the OSI model.

9. The method according to claim 6, wherein digitizing the analog signals includes generating 12-bit data.

* * * * *